Figure 1:
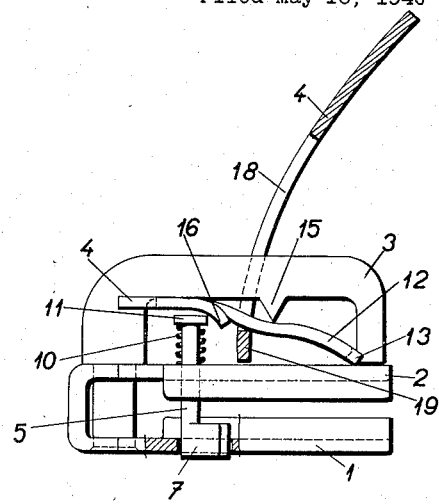

Jan. 13, 1942.  V. PUC  2,270,221

SLIDING MEMBER OF SLIDING CLASP FASTENERS

Filed May 16, 1940

Inventor
V. Puc
By Glascock Downing & Seebold
Attys

Patented Jan. 13, 1942

2,270,221

UNITED STATES PATENT OFFICE 2,270,221

SLIDING MEMBER OF SLIDING CLASP FASTENERS

Vojtech Puc, Prague, Czechoslovakia

Application May 16, 1940, Serial No. 335,623
In Czechoslovakia May 18, 1938

6 Claims. (Cl. 24—205.5)

This invention relates to a sliding member for sliding clasp fasteners, which is held in every position to which it is set by a locking member which engages in the fastener elements and is actuated by the pull member of the sliding member.

In the known constructional forms of such automatically locked sliding members of sliding clasp fasteners either the bow part which serves for the fixing of the pull member was used directly, the free end of which was forced resiliently between the fastener elements, or the locking member was an independent member made in the form of an elongated spring which was provided with locking means and was mounted in a recess of the fixed bow part of the pull member. All these constructional forms have the disadvantage, that the lift of the locking member, which is necessary, in order that the locking member will not during the movement of the sliding member slide on the fastener elements and for instance damage the varnish or the softer material of the elements (for instance aluminium), of which these are mostly made, could not be properly effected.

All these disadvantages are overcome by the sliding member formed in accordance with the invention through the locking member having the form of a spring-loaded pin which extends through the two plates of the sliding member and engages at the under side of the band carrying the fastener elements by means of two locking teeth in the gaps between the fastener elements, the release of the locking being effected, when pulling the pull member of the sliding member in one direction or the other, with the aid of a supporting lever adapted to rock to both sides, which lever is loosely mounted in an opening of the fixed bow part of the sliding member. The locking pin is disposed in the vicinity of the broader, that is emerging end of the sliding member and its locking teeth extend approximately perpendicularly to the side edges of the sliding member at the emerging end, so that the locking of the two bands of the sliding clasp fastener can be effected in a position, where these bands are already separated. The supporting lever for releasing the pin is guided with one of its ends at the upwardly extending arms of the bow part and, for the purpose of swinging in the manner of a scale beam, coacts with a projection on the under side of the upper arm of the bow part. The bow part and the supporting lever are inserted through an opening of the pull member which, on being pulled in one direction or the other, acts on the end of the supporting lever and thereby releases the locking.

The further features of the arrangement according to the invention will be gathered from the following description and with reference to the accompanying drawing, in which a constructional example of the sliding member according to the invention is illustrated.

In the drawing

Figure 2:
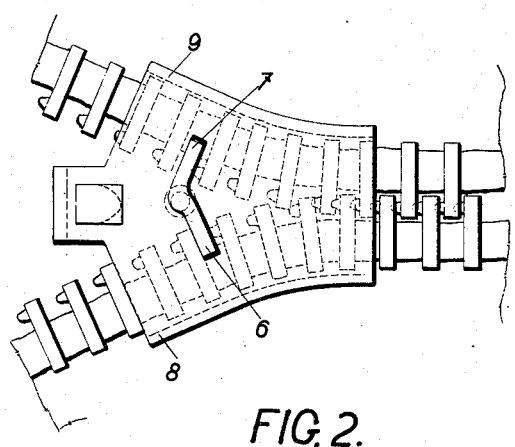
Figure 3:
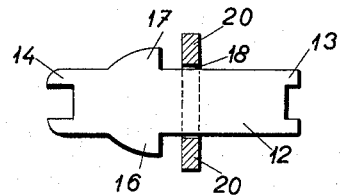

Fig. 1 is a side elevation of the sliding member of the sliding clasp fastener with automatic locking, Fig. 2 a diagrammatic view of the sliding member according to the invention, as seen from below and Fig. 3 a view from above of the supporting lever for actuating the locking member.

The locking arrangement of the sliding member consists substantially of the usual bottom plate 1, the upper plate 2, the fixed bow part 3 and the pull member 4. The locking member according to the invention is made in the form of a pin 5 which passes through the two plates in the transverse direction. Its upper end extends into the space below the bow part and its lower end is provided with two locking teeth or lugs 6, 7 which extend from the pin approximately perpendicularly to the side walls 8, 9 of the sliding member at its emerging end. Over the upper projecting end of the pin 5 a helical spring 10 is slipped, which bears against the upper plate 2 of the sliding member and against the collar 11 of the pin. This spring holds the locking pin 5 in the upper extreme position, in which the teeth 6, 7 engage in the gaps between the fastener elements of the two bands and secure the lock against any further opening, even when a pull is exerted on the fastener elements. For releasing this locking a supporting lever 12 is loosely mounted in the opening of the bow part 3, which lever is actuated by the pull member of the sliding member. The length of the lever 12 corresponds approximately to the length of the opening in the bow part, increased by the forked ends 13, 14, with which the lever is guided loosely on the upwardly extending arms of the bow part 3. As will be seen from Fig. 1, the forward end of the lever 12 is slightly curved in the direction towards the upper plate 2, its middle part being bent with the opposite curvature and merging into the straight rearward end parts which are guided by the fork 14 on the bow part. Opposite the middle bent part of the plate 12 there is provided on the under side of the bow part a supporting projection 15 in the form of the knife edge of a scale beam and at that part of the plate, immediately in front of the place of contact with the spring pin 5, the plate is provided with lateral abutments 16, 17 which at the forward edge are bent slightly downwards (Figs. 1 and 3). The pull member 4 which is provided with the lateral opening 18 is mounted on the bow part of the sliding member in such a manner that its lower transverse part 19 travels below the supporting lever 12, the width of the opening 18 between the side arms 20 of the pull member corresponding approximately to the width of the lever 12. The release of the sliding member, in order to slide it in one direction or the other, is effected in the following manner:

In Fig. 1 the position of the component parts of the sliding member is shown in the locked position, in which the spring 10 forces the locking teeth 6, 7 of the pin 5 into the gaps between the fastener elements of the two bands of the sliding clasp fastener, into the parts thereof which are just leaving one another. When the lock is to be opened by moving the sliding member to the right, first of all the pull member 4 is moved out of the position shown in the drawing to the right-hand end of the opening in the bow part 3, the lower transverse part 19 of the pull member penetrating between the upper plate 2 of the sliding member and the forward end of the supporting lever 12, which latter it raises. The lever will then with its forward bent part bear against the projection 15 and its rearward part will swing downwards, forcing the pin 5 downwards in opposition to the spring 10 in such a manner that its locking teeth 6, 7 will move out through the corresponding opening in the bottom plate 1 of the sliding member and release the elements of the fastener bands. The sliding member released in this way can open the lock, when the pull member 4 is pulled further to the right. As soon as the pull on the pull member ceases, the spring 10 will in any position raise the pin and the sliding member will be locked firmly on the two bands of the sliding clasp fastener.

When the sliding member is moved in the opposite direction, the pull member 4 is laid over out of the position shown in Fig. 1 to the left and its side arms 20 will lie against the abutments 16, 17 of the lever 12, so that, on the pull member being pulled to the left, the rear end of the lever 12 will rock about the knife edge 15 downwards and the locking pin 5 will be moved out of engagement with the bands of the fastener. On the pull on the pull member ceasing, the sliding member will in this case as well be automatically locked in any desired position.

The constructional form shown in the drawing may be modified as regards its details in various ways, without departing from the spirit of the invention. Thus for instance, for springing the locking pin, instead of a helical spring a rubber cylinder or a rubber washer may be used, which will always bring the pin back into the raised position.

What I claim is:

1. A slider for a slide fastener of the type which includes a pair of stringers having rows of spaced interlocking elements along their longitudinal edges, comprising an upper plate and a lower plate spaced to receive the interlocking elements of the stringers, locking lugs movable upwardly and downwardly in the lower plate and into said space, a pin operatively connected with the lugs and movable upwardly and downwardly through the upper plate, resilient means cooperating with the pin and lugs for yieldingly maintaining them in an upright position, a fixed bow arranged on the upper plate and forming an elongated recess, a lever arranged in the recess and having its ends slidably interlocked with the ends of the bow, said lever being rockable about a horizontal axis arranged substantially midway between the ends thereof, a head on the pin arranged between said axis and one end of the bow and adapted to be engaged by the lever for depressing the pin and locking lugs when one end portion of the lever moves downwardly, and a pull member movable lengthwise of the recess and arranged to engage the opposite end portion of the lever for moving the latter upwardly when the pull member is moved in one direction.

2. A slider for a slide fastener of the type which includes a pair of stringers having rows of spaced interlocking elements along their longitudinal edges, comprising an upper plate and a lower plate spaced to receive the interlocking elements of the stringers, locking lugs movable upwardly and downwardly in the lower plate and into said space, a pin operatively connected with the lugs and movable upwardly and downwardly through the upper plate, resilient means cooperating with the pin and lugs for yieldingly maintaining them in an upright position, a fixed bow arranged on the upper plate and forming an elongated recess, a lever arranged in the recess and having its ends slidably interlocked with the ends of the bow, said lever being rockable about a horizontal axis arranged substantially midway between the ends thereof, a head on the pin arranged between said axis and one end of the bow and adapted to be engaged by the lever for depressing the pin and locking lugs when one end portion of the lever moves downwardly, a pull member movable lengthwise of the recess and arranged to engage the opposite end portion of the lever for moving the latter upwardly when the pull member is moved in one direction, and means for limiting the movement of the pull member along the lever in the opposite direction.

3. A slider for a slide fastener of the type which includes a pair of stringers having rows of spaced interlocking elements along their longitudinal edges, comprising an upper plate and a lower plate spaced to receive the interlocking elements of the stringers, locking lugs movable upwardly and downwardly in the lower plate and into said space, a pin operatively connected with the lugs and movable upwardly and downwardly through the upper plate, resilient means cooperating with the pin and lugs for yieldingly maintaining them in an upright position, a fixed bow arranged on the upper plate and forming an elongated recess, a lever arranged in the recess and having its ends slidably interlocked with the ends of the bow, said lever being rockable about a horizontal axis arranged substantially midway between the ends thereof, a head on the pin arranged between said axis and one end of the bow and adapted to be engaged by the lever for depressing the pin and locking lugs when one end portion of the lever moves downwardly, a pull member movable lengthwise of the recess and arranged to engage the opposite end portion of the lever for moving the latter upwardly when the pull member is moved in one direction, and an abutment on the lever between said axis and pin for limiting the movement of the pull member in the opposite direction.

4. A slider for a slide fastener of the type which includes a pair of stringers having rows of spaced interlocking elements along their longitudinal edges, comprising an upper plate and a lower plate spaced to receive the interlocking elements of the stringers, locking lugs movable upwardly and downwardly in the lower plate and into said space, a pin operatively connected with the lugs and movable upwardly and downwardly through the upper plate, resilient means cooperating with the pin and lugs for yieldingly maintaining them in an upright position, a fixed bow arranged on the upper plate and forming an elongated recess, a lever arranged in the recess and having its ends slidably interlocked with the ends of the bow, said lever being rockable about a horizontal axis arranged substantially midway between the ends thereof, a head on the pin arranged between said axis and one end of the bow and adapted to be engaged by the lever for depressing the pin and locking lugs when one end portion of the lever moves downwardly, and a pull member movable lengthwise of the recess and arranged to engage the opposite end portion of the lever for moving the latter upwardly when the pull member is moved in one direction, said resilient means being a coil spring surrounding the pin and arranged between the upper plate and the head of the pin.

5. A slider for a slide fastener of the type which includes a pair of stringers having rows of spaced interlocking elements along their longitudinal edges, comprising an upper plate and a lower plate spaced to receive the interlocking elements of the stringers, locking lugs movable upwardly and downwardly in the lower plate and into said space, a pin operatively connected with the lugs and movable upwardly and downwardly through the upper plate, resilient means cooperating with the pin and lugs for yieldingly maintaining them in an upright position, a fixed bow arranged on the upper plate and forming an elongated recess, a lever arranged in the recess and having its ends slidably interlocked with the ends of the bow, said lever being rockable about a horizontal axis arranged substantially midway between the ends thereof, a head on the pin arranged between said axis and one end of the bow and adapted to be engaged by the lever for depressing the pin and locking lugs when one end portion of the lever moves downwardly, and a pull member movable lengthwise of the recess and arranged to engage the opposite end portion of the lever for moving the latter upwardly when the pull member is moved in one direction, said locking lugs being united with the lower end of the pin.

6. A slider for a slide fastener of the type which includes a pair of stringers having rows of spaced interlocking elements along their longitudinal edges, comprising an upper plate and a lower plate spaced to receive the interlocking elements of the stringers, locking lugs movable upwardly and downwardly in the lower plate and into said space, a pin operatively connected with the lugs and movable upwardly and downwardly through the upper plate, resilient means cooperating with the pin and lugs for yieldingly maintaining them in an upright position, a fixed bow arranged on the upper plate and forming an elongated recess, a lever arranged in the recess and having its ends slidably interlocked with the ends of the bow, said lever being rockable about a horizontal axis arranged substantially midway between the ends thereof, a head on the pin arranged between said axis and one end of the bow and adapted to be engaged by the lever for depressing the pin and locking lugs when one end portion of the lever moves downwardly, a pull member movable lengthwise of the recess and arranged to engage the opposite end portion of the lever for moving the latter upwardly when the pull member is moved in one direction, and a pointed protuberance projecting downwardly from the medial portion of the bow and engaging the upper surface of the lever.

VOJTECH PUC.